(12) United States Patent
Akuzawa et al.

(10) Patent No.: US 9,979,315 B2
(45) Date of Patent: May 22, 2018

(54) RECTIFYING CIRCUIT FOR HIGH-FREQUENCY POWER SUPPLY

(71) Applicant: MITSUBISHI ELECTRIC ENGINEERING COMPANY, LIMITED, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: MITSUBISHI ELECTRIC ENGINEERING COMPANY, LIMITED, Chiyoda-ku (JP)

( * ) Notice: Subject to any disclaimer, the term of this patent is extended or adjusted under 35 U.S.C. 154(b) by 0 days. days.

(21) Appl. No.: 15/030,425

(22) PCT Filed: Nov. 15, 2013

(86) PCT No.: PCT/JP2013/080911
§ 371 (c)(1),
(2) Date: Apr. 19, 2016

(87) PCT Pub. No.: WO2015/072015
PCT Pub. Date: May 21, 2015

(65) Prior Publication Data
US 2016/0254759 A1  Sep. 1, 2016

(51) Int. Cl.
*H02M 7/06* (2006.01)
*H02M 7/219* (2006.01)
(Continued)

(52) U.S. Cl.
CPC .............. *H02M 7/06* (2013.01); *H02M 1/14* (2013.01); *H02M 7/219* (2013.01);
(Continued)

(58) Field of Classification Search
CPC .. H02M 1/14; H02M 2001/0058; H02M 7/06; H02M 7/219; Y02B 70/1441; Y02B 70/1491
See application file for complete search history.

(56) References Cited

U.S. PATENT DOCUMENTS 5,420,497 A * 5/1995 Kimura ................. G05F 1/67
                                                       307/64
6,621,183 B1    9/2003 Boys
(Continued)

FOREIGN PATENT DOCUMENTS

JP    2001-238372 A    8/2001
JP    2001-526517 A    12/2001
(Continued)

OTHER PUBLICATIONS

International Search Report dated Feb. 18, 2014, in PCT/JP2013/080911 Filed Nov. 15, 2013.
(Continued)

*Primary Examiner* — Adolf Berthane
*Assistant Examiner* — Bart Iliya
(74) *Attorney, Agent, or Firm* — Oblon, McClelland, Maier & Neustadt, L.L.P.

(57) ABSTRACT

A rectifying circuit for high-frequency power supply that rectifies an alternating voltage at a high frequency exceeding 2 MHz, the rectifying circuit for high-frequency power supply including a bridge rectifier circuit that rectifies the alternating voltage inputted from a reception antenna for power transmission, a matching functional circuit that matches a resonance condition to that of the reception antenna for power transmission, and a smoothing functional circuit that smooths the voltage rectified by the bridge rectifier circuit into a direct voltage, in which the rectifying circuit for high-frequency power supply causes the bridge rectifier circuit to perform partial resonant switching in a
(Continued)

switching operation at the time of rectification by using the matching functional circuit and the smoothing functional circuit.

14 Claims, 11 Drawing Sheets

(51) Int. Cl.
*H02M 1/14* (2006.01)
*H02M 1/00* (2006.01)

(52) U.S. Cl.
CPC .. *H02M 2001/0058* (2013.01); *Y02B 70/1441* (2013.01); *Y02B 70/1491* (2013.01)

(56) References Cited

U.S. PATENT DOCUMENTS

| | | | | |
|---|---|---|---|---|
| 8,278,784 B2* | 10/2012 | Cook | ............... | H01Q 1/2225 |
| | | | | 307/149 |
| 8,487,551 B1* | 7/2013 | Chen | ............... | H05B 41/2855 |
| | | | | 315/177 |
| 2007/0086219 A1* | 4/2007 | Yasumura | ......... | H02M 3/33507 |
| | | | | 363/21.02 |
| 2007/0201251 A1* | 8/2007 | Yasumura | ......... | H02M 3/33507 |
| | | | | 363/21.02 |
| 2011/0053500 A1* | 3/2011 | Menegoli | ............. | H04B 5/0037 |
| | | | | 455/41.1 |
| 2011/0084752 A1* | 4/2011 | Julstrom | ............... | H02J 7/025 |
| | | | | 327/336 |
| 2011/0309689 A1 | 12/2011 | Kamata | | |
| 2012/0068548 A1* | 3/2012 | Endo | ............. | H02J 5/005 |
| | | | | 307/104 |
| 2014/0177305 A1* | 6/2014 | Irish | ............. | H02M 7/217 |
| | | | | 363/127 |
| 2014/0247625 A1 | 9/2014 | Hosotani | | |
| 2016/0248339 A1* | 8/2016 | Akuzawa | ............ | H02M 7/06 |

FOREIGN PATENT DOCUMENTS

| | | |
|---|---|---|
| JP | 2010-130800 A | 6/2010 |
| JP | 2012-23949 A | 2/2012 |
| WO | WO 2013/058174 A1 | 4/2013 |

OTHER PUBLICATIONS

Yoshikawa, et al., "A Novel 10Hz-Range Class-E Multi-Resonant ZVS Wireless Power Transfer System with Direct Current Resonance," The 2013 Institute of Electronics, Information and Communication Engineers General Conference, BCS-1-18, 2013 (2 pages).

Office Action dated Feb. 17, 2015 in Japanese Patent Application No. 2014-555872 (with unedited computer generated English translation).

Office Action dated Jul. 14, 2015 in Japanese Patent Application No. 2014-555872 (with unedited computer generated English translation).

* cited by examiner

RECTIFYING CIRCUIT FOR HIGH-FREQUENCY POWER SUPPLY

FIELD OF THE INVENTION

The present invention relates to a rectifying circuit for high-frequency power supply that rectifies an alternating current power supply at a high frequency.

BACKGROUND OF THE INVENTION

A bridge rectifier circuit according to a conventional technology, for use in rectification in a MHz band, is shown in FIG. 11. This bridge rectifier circuit has the same configuration as bridge rectifier circuits which are used at a low frequency of 50 or 60 Hz, and is the one in which only diodes D1 to D4 are replaced by elements for high-speed operation. By means of the bridge rectifier circuit and a smoothing circuit which are shown in FIG. 11, an alternating voltage Vin inputted from a resonant type reception antenna 10 is rectified and converted into a direct voltage (for example, refer to nonpatent reference 1).

RELATED ART DOCUMENT

Nonpatent Reference

Nonpatent reference 1: The 2013 Institute of Electronics, Information and Communication Engineers General Conference BCS-1-18

SUMMARY OF THE INVENTION

Problems to be Solved by the Invention

However, in the conventional configuration, the configuration of the bridge rectifier circuit used at a low frequency is applied just as it is. A problem is therefore that in the rectification at a high frequency equal to or higher than a MHz band, the switching loss of the diodes D1 to D4 increases, and the power conversion efficiency decreases (it is said that the power conversion efficiency is typically 85% or less). The power loss in the circuit which occurs at the time of the rectifying operation results in heat energy and hence a temperature rise of the circuit board. This results in an increase in the operating environment temperature of the circuit board and a reduction in the life of the used parts. Therefore, a measure, such as a measure of providing an exhaust heat device, is needed, and the conventional configuration also causes an increase in cost, upsizing, and an increase in mass.

The present invention is made in order to solve the above-mentioned problems, and it is therefore an object of the present invention to provide a rectifying circuit for high-frequency power supply that can provide a high power conversion efficiency characteristic in rectification of an alternating voltage at a high frequency equal to or higher than 2 MHz.

Means for Solving the Problem

According to the present invention, there is provided a rectifying circuit for high-frequency power supply that rectifies an alternating voltage at a high frequency exceeding 2 MHz, the rectifying circuit for high-frequency power supply including: a bridge rectifier circuit that rectifies the alternating voltage inputted from a reception antenna for power transmission; a matching functional circuit that matches a resonance condition to that of the reception antenna for power transmission; and a smoothing functional circuit that smooths the voltage rectified by the bridge rectifier circuit into a direct voltage, in which the rectifying circuit high-frequency power supply causes the bridge rectifier circuit to perform partial resonant switching in a switching operation at the time of rectification by using the matching functional circuit and the smoothing functional circuit.

Advantages of the Invention

Because the rectifying circuit for high-frequency power supply according to the present invention is configured as above, is a high power conversion efficiency characteristic can be provided in the rectification of the alternating voltage at a high frequency equal to or higher than 2 MHz.

EMBODIMENTS OF THE INVENTION

Hereafter, the preferred embodiments of the present invention will be explained in detail with reference to the drawings.

Embodiment 1

Figure 1:
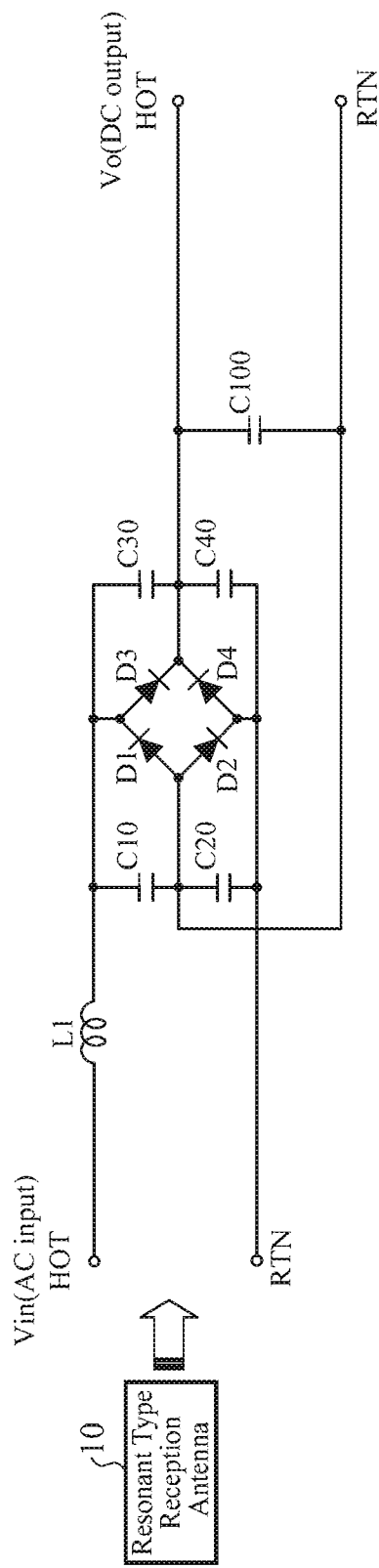
FIG. 1 is a diagram showing the configuration of a rectifying circuit for high-frequency power supply according to Embodiment 1 of the present invention.
Figure 2:
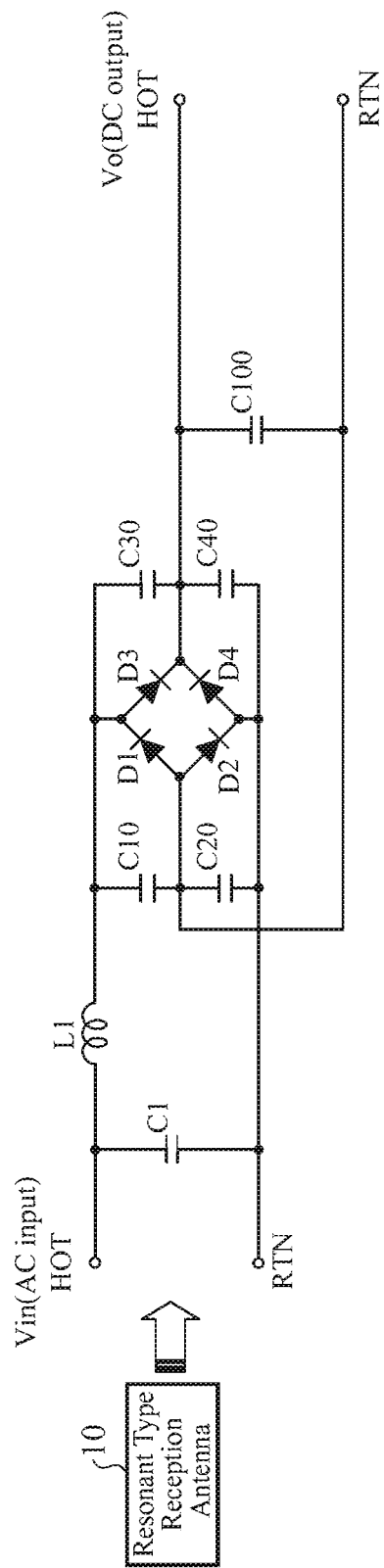
FIG. 2 is a diagram showing another example of the configuration of the rectifying circuit for high-frequency power supply according to Embodiment 1 of the present invention.
Figure 3:
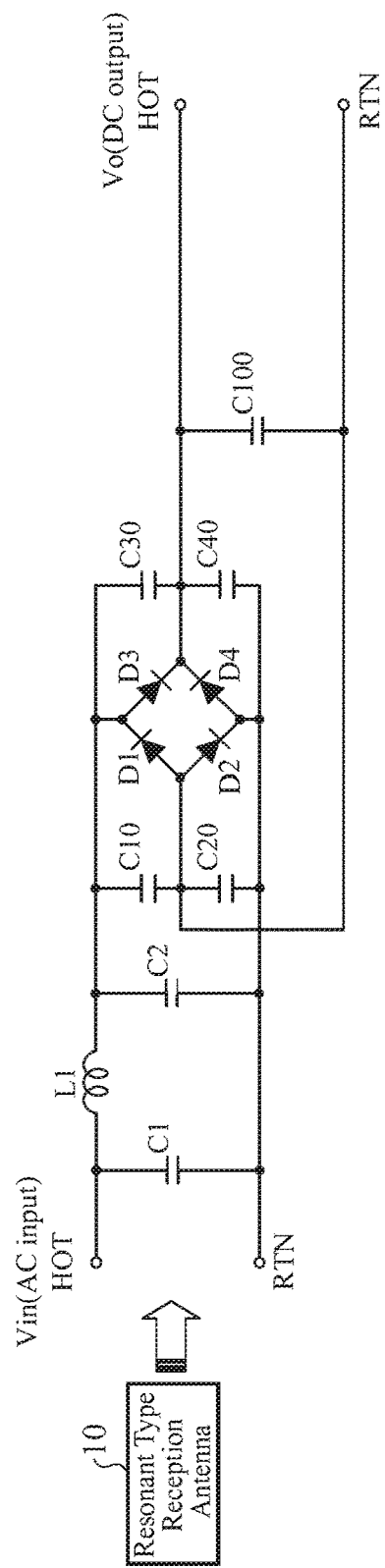
FIG. 3 is a diagram showing another example of the configuration of the rectifying circuit for high-frequency power supply according to Embodiment 1 of the present invention.
Figure 4:
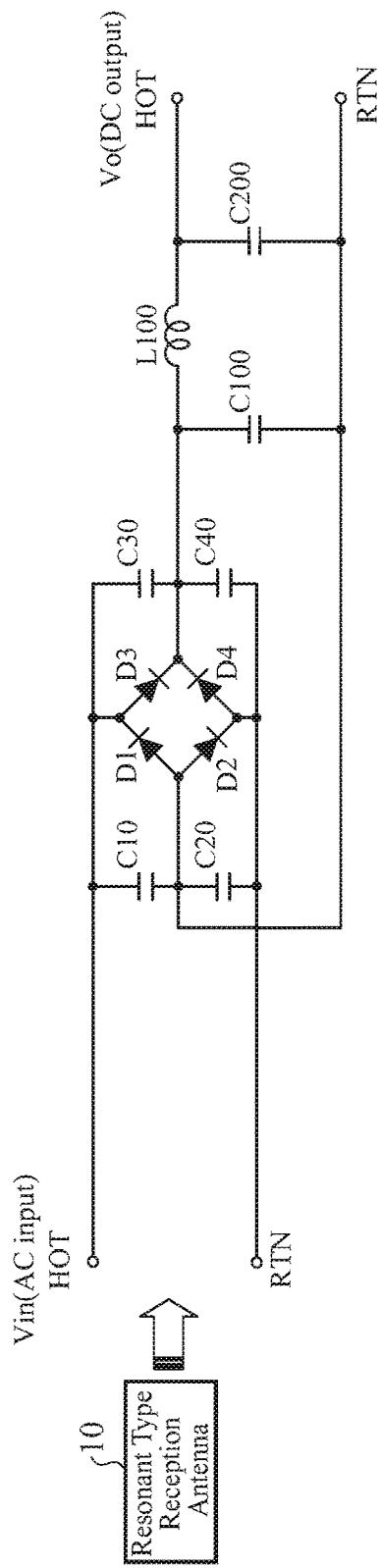
FIG. 4 is a diagram showing another example of the configuration of the rectifying circuit for high-frequency power supply according to Embodiment 1 of the present invention.
Figure 5:
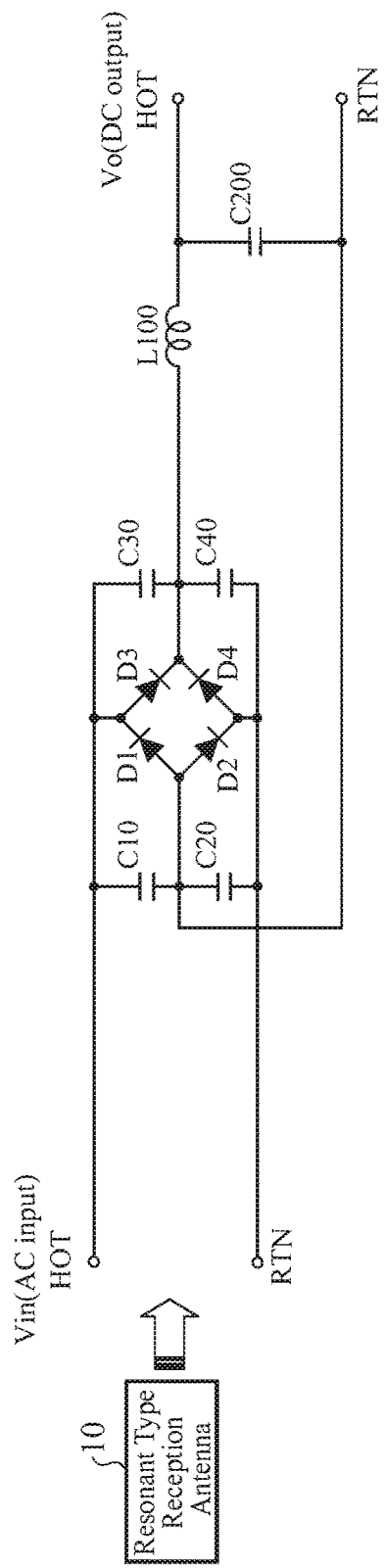
FIG. 5 is a diagram showing another example of the configuration of the rectifying circuit for high-frequency power supply according to Embodiment 1 of the present invention.
Figure 6:
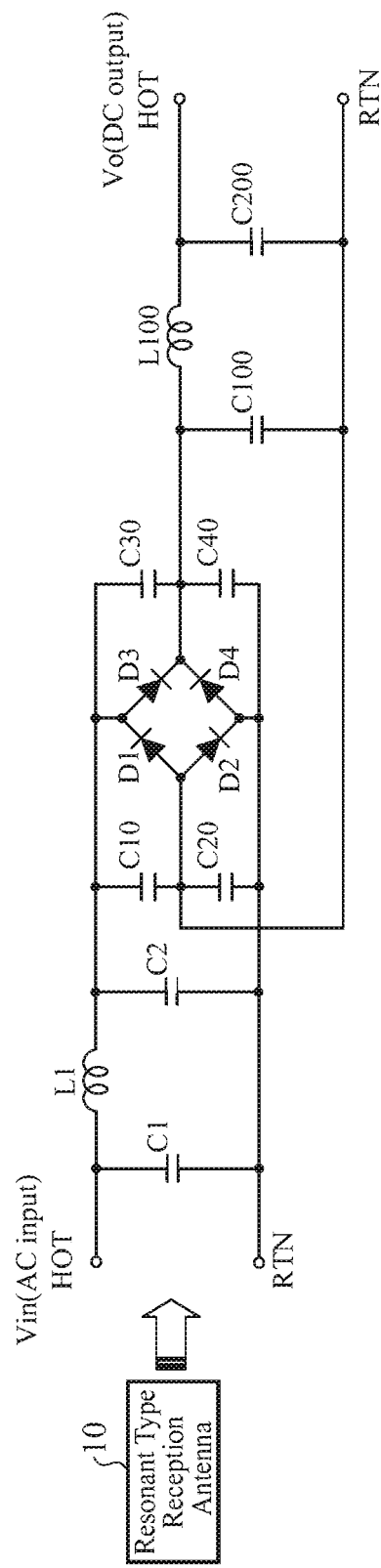
FIG. 6 is a diagram showing another example of the configuration of the rectifying circuit for high-frequency power supply according to Embodiment 1 of the present invention.
Figure 7:
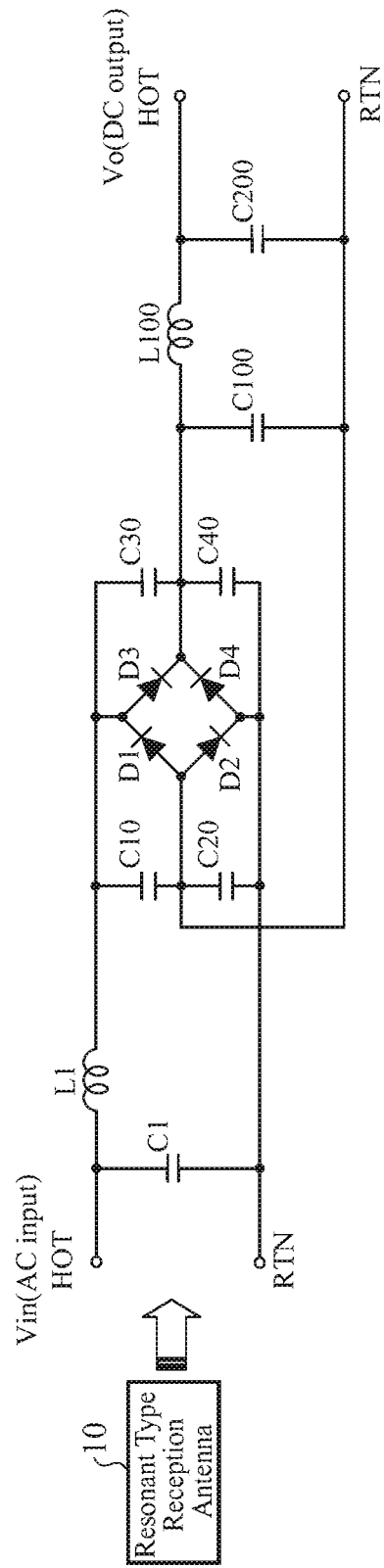
FIG. 7 is a diagram showing another example of the configuration of the rectifying circuit for high-frequency power supply according to Embodiment 1 of the present invention.
Figure 8:
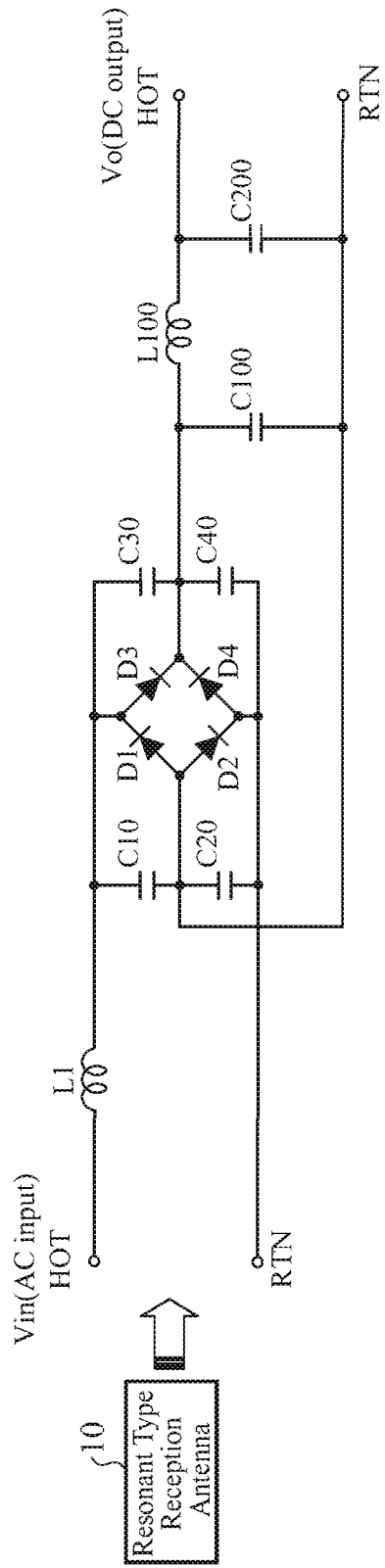
FIG. 8 is a diagram showing another example of the configuration of the rectifying circuit for high-frequency power supply according to Embodiment 1 of the present invention.

FIG. 1 is a diagram showing the configuration of a rectifying circuit for high-frequency power supply according to Embodiment 1 of the present invention.

The rectifying circuit for high-frequency power supply rectifies an alternating voltage Vin at a high frequency exceeding 2 MHz. This rectifying circuit for high-frequency power supply is configured with diodes D1 to D4, capacitors C10 to C40, an inductor L1 and a capacitor C100, as shown in FIG. 1.

A resonant type reception antenna (a reception antenna for power transmission) 10 is a resonant type antenna for power transmission having LC resonance characteristics (which is not limited only to a noncontact type one). This resonant type is reception antenna 10 can be of any of magnetic-field resonance type, electric-field resonance type, and electromagnetic induction type.

The diodes D1 to D4 are a rectifying device that constructs a bridge rectifier circuit for converting the alternating voltage Vin at a high frequency exceeding 2 MHz, which is inputted from the resonant type reception antenna 10, into a direct voltage. As these diodes D1 to D4, not only diodes for high frequency (RF; Radio Frequency) but also elements, such as diodes of, for example, Si type, SiC type or GaN type, or Schottky barrier diodes, can be used.

The capacitors C10 to C40 are constants that consist of either the parasitic capacitances of the diodes D1 to D4 or combined capacitances of the parasitic capacitances and the capacitances of discrete elements.

The inductor L1 is an element that constructs a matching functional circuit for performing impedance matching with the resonant type reception antenna 10 on an input side (matching the resonance condition to that of the resonant type reception antenna 10). As this inductor L1, an air-core coil, a magnetic material coil or the like can be used.

The capacitor C100 is an element that constructs a smoothing functional circuit for smoothing a ripple voltage after being rectified by the diodes D1 to D4 into a direct voltage. As this capacitor C100, an element, such as a ceramic capacitor, a tantalum capacitor or a film capacitor, can be used.

The rectifying circuit for high-frequency power supply according to the present invention is configured in this way so as to include the three functions (the matching function, the rectifying function and the smoothing function) in the single circuit configuration which is not established by using a circuit designing method of keeping those functions separated. The rectifying circuit for high-frequency power supply has a function of performing matching with the output impedance of the resonant type reception antenna 10 by using a compound function according to the inductor L1, the capacitors C10 C40 and the capacitor C100, and also has a function of causing the diodes D1 to D4 to perform partial resonant switching in the switching operation at the time of rectification by using the compound function. As a result, the switching loss of the diodes D1 to D4 is reduced.

Next, the operation of the rectifying circuit, for high-frequency power supply configured as above will be explained.

First, when the alternating voltage Vin having a high frequency exceeding 2 MHz is inputted from the resonant type reception antenna 10, matching with the output impedance of the resonant type reception antenna 10 is achieved by the compound function according to the inductor L1, the capacitors C10 to C40 and the capacitor C100. Then, while the matching state is maintained, the inputted alternating voltage Vin is rectified into a apple voltage having a one-sided electric potential (a positive electric potential) by the diodes D1 to D4. At that time, because the switching operation by the diodes D1 to D4 becomes partial resonant switching operation by virtue of the compound function according to the inductor L1, the capacitors C10 to C40 and the capacitor C100, and approaches a ZVS (zero voltage switching) state, the operation is implemented with a small switching loss. Then, the ripple voltage after being rectified is smoothed into a direct voltage by the capacitor C100, and the direct voltage is outputted.

Through the above-mentioned series of operations, the rectifying circuit for high-frequency power supply can rectify the inputted alternating voltage Vin having a high frequency into a direct voltage with high power conversion efficiency (equal to or greater than 90%), and output the direct voltage.

As mentioned above, because the rectifying circuit for high-frequency power supply according to this Embodiment 1 is configured in such a way that the functions of a matching circuit and a smoothing circuit, are disposed in the bridge rectifier circuit, and the bridge rectifier circuit, is caused to perform partial resonant switching in the switching operation at the time of rectification, the rectifying circuit for high-frequency power supply also has those functions as a characteristic of the rectifying operation, and enables the rectifying operation which achieves matching with the output impedance characteristics of the resonant type reception antenna 10 on the input side, and matching with the load impedance characteristics on the output side. As a result, the loss at the time of the rectifying operation at a high frequency equal to or higher than a MHz band can be greatly reduced, and high power conversion efficiency (efficiency of 90% or more) can be achieved.

Further, because the power loss in the circuit which occurs at the time of the rectifying operation is small, and hence the heat energy generated is also small and the temperature rise of the circuit board is also suppressed to a low value, the influence of the operating environment temperature on the life of the used parts can be reduced. Therefore, a measure, such as a measure of providing a conventional exhaust heat device, is not needed, and a cost reduction, downsizing, a weight reduction and low power consumption can be achieved.

In FIG. 1, the case in which the rectifying circuit for high-frequency power supply is configured using the capacitors C10 to C40, the diodes D1 to D4, the inductor L1 and the capacitor C100 is shown. However, this embodiment is not limited to this example. For example, the rectifying circuit high-frequency power supply can have a configuration as shown in any one of FIGS. 2 to 8. In this case, the rectifying circuit for high-frequency power supply can have a configuration which is an optimal one selected from among the configurations shown in FIGS. 1 to 8 according to both the configuration (the output impedance) of the resonant type reception antenna 10, and the input impedance of a device which is connected to the output (DC output) of the rectifying circuit for high-frequency power supply.

Figure 9:
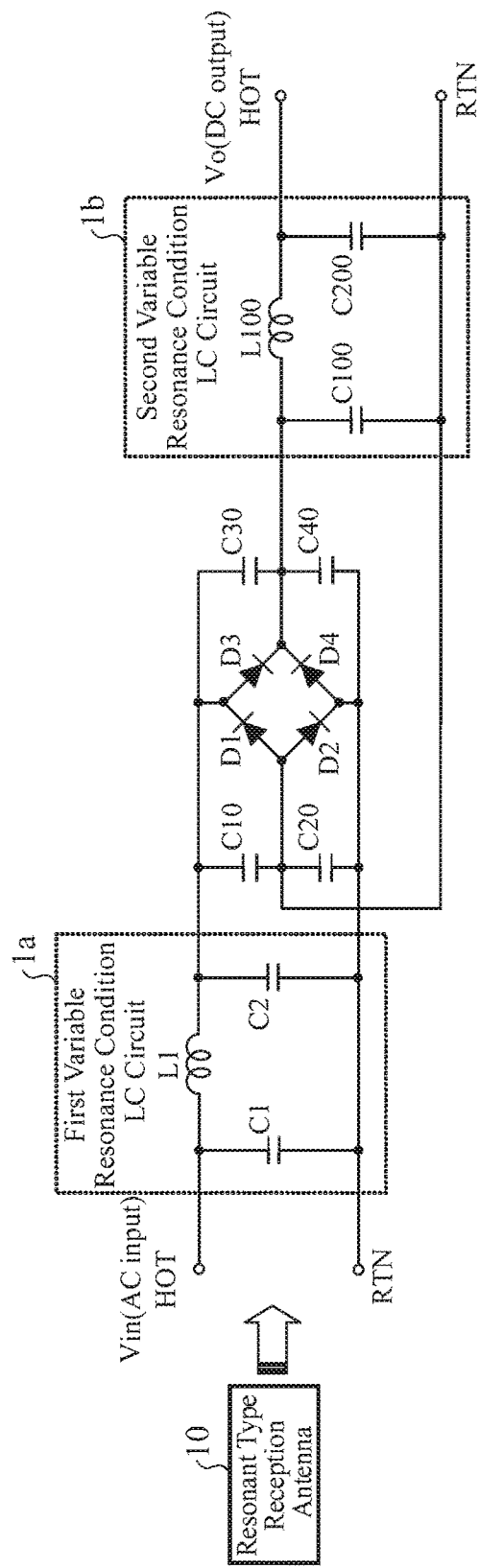
FIG. 9 is a diagram showing another example of the configuration of the rectifying circuit for high-frequency power supply according to Embodiment 1 of the present invention (in a case in which variable resonance condition LC circuits are disposed)

Further, although the explanation is made as to the example shown in FIG. 1 by assuming that the constant of the inductor L1 which constructs the matching functional circuit is fixed and the resonance condition is fixed, this embodiment is not limited to this example. For example, as shown in FIG. 9, variable resonance condition LC circuits (first and second variable resonance condition LC circuits 1a and 1b) each of that causes a resonance condition to be variable can be used. FIG. 9 shows an example in which the variable resonance condition LC circuits are applied to the configuration shown in FIG. 6 and having the largest parts count among the configurations shown in FIGS. 1 to 8, and the variable range of the resonance condition is the widest. In the example of FIG. 9, the first variable resonance condition LC circuit 1a causes the constants of the inductor L1 and capacitors C1 and C2 to be variable, and the second variable resonance condition LC circuit 1b causes the constants of an inductor L100, and the capacitor C100 and a capacitor C200 to be variable.

Variable resonance condition LC circuits can be applied similarly to the examples shown in FIGS. 1 to 5, 7 and 8. In the case of FIG. 1, a variable resonance condition LC circuit that causes the constant of the inductor L1 to be variable is disposed. Further, in the case of FIG. 2, a variable resonance condition LC circuit that causes the constants of the inductor L1 and a capacitor C1 to be variable is disposed. Further, in the case of FIG. 3, a variable resonance condition LC circuit that causes the constants of the inductor L1 and capacitors C1 and C2 to be variable is disposed. Further, in the case of FIG. 4, a variable resonance condition LC circuit that causes the constant of the capacitor C100 to be variable is disposed. Further, in the case of FIG. 5, a variable resonance condition LC circuit that causes the constants of an inductor L100 and a capacitor C200 to be variable is disposed. Further, in the case of FIG. 7, a variable resonance condition LC circuit that causes the constants of an inductor L1 and a capacitor C1 to be variable is disposed. Further, in the case of FIG. 8, a variable resonance condition LC circuit that causes the constant of the inductor L1 to be variable is disposed.

Embodiment 2

Figure 10:
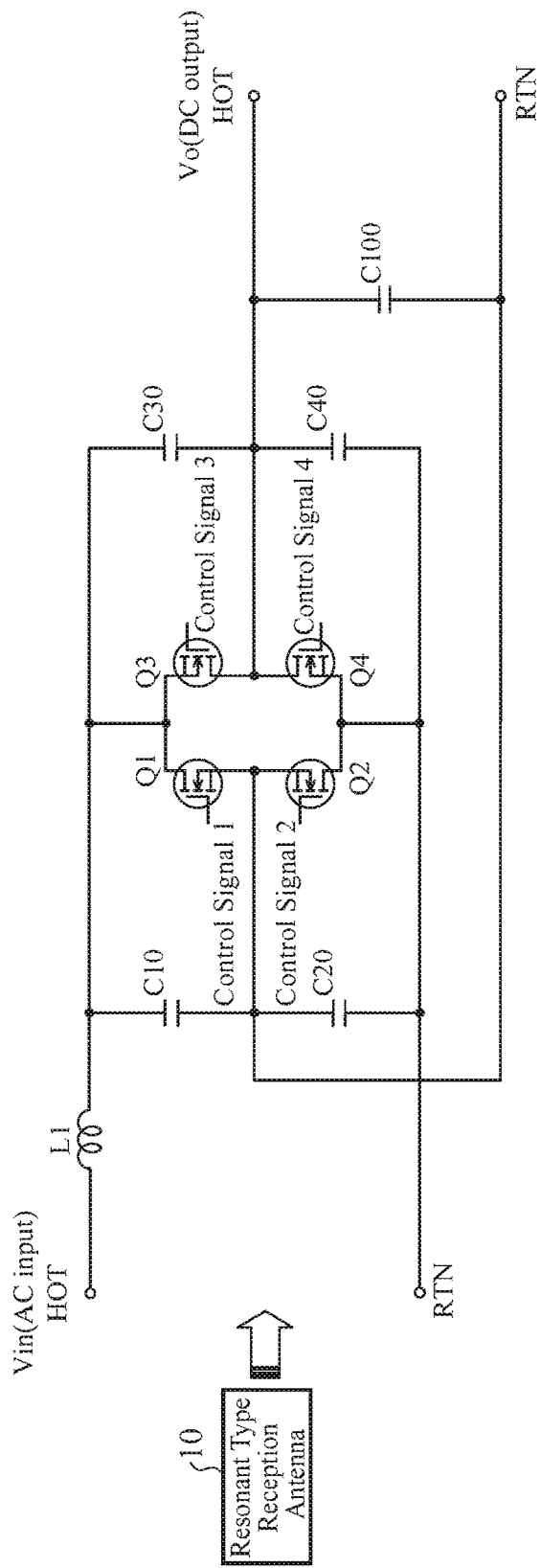
FIG. 10 is a diagram showing another example of the configuration of the rectifying circuit for high-frequency power supply according to Embodiment 2 of the present invention (in a case in which FETs are used instead of diodes)
Figure 11:
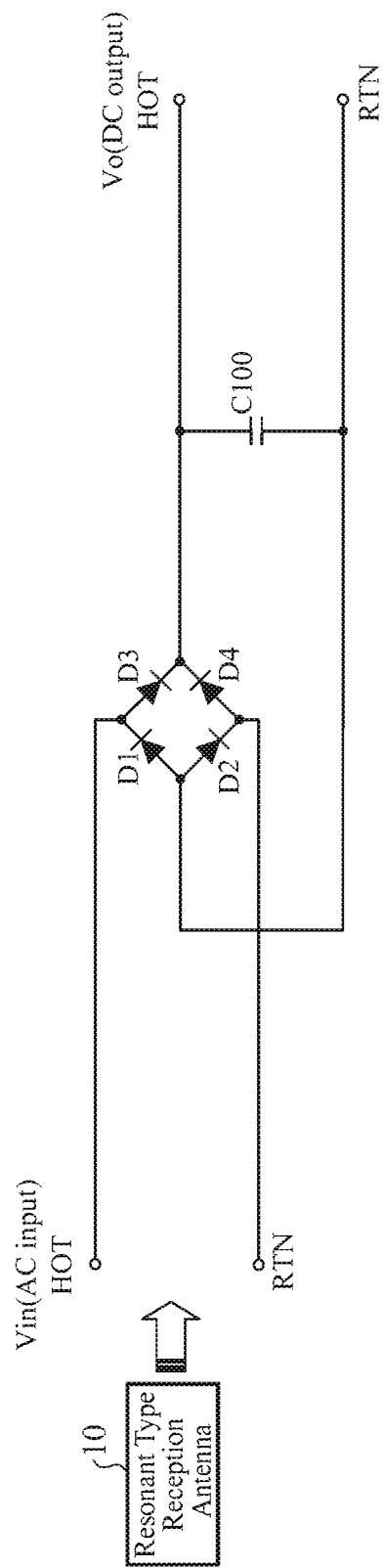
FIG. 11 is a diagram showing the configuration of a conventional rectifying circuit for high-frequency power supply.

FIG. 10 is a diagram showing the configuration of a rectifying circuit for high-frequency power supply according to Embodiment 2 of the present invention. The rectifying circuit for high-frequency power supply according to Embodiment 2 shown in FIG. 10 is the one in which the diodes D1 to D4 of the rectifying circuit for high-frequency power supply according to Embodiment 1 shown in FIG. 1 are replaced by power semiconductor elements Q1 to Q4. The other components are the same as those according to Embodiment 1 and are designated by the same reference character strings, and an explanation will be made as to only a different portion.

The power semiconductor elements Q1 to Q4 construct a bridge rectifier circuit for converting an alternating voltage Vin at a high frequency exceeding 2 MHz, which is inputted from a resonant type reception antenna 10, into a direct voltage. Body diodes of the power semiconductor elements Q1 to Q4 are arranged in such a way that the body diodes are oriented toward the same directions as those toward which the diodes D1 to D4 according to Embodiment 1 are oriented. As these power semiconductor elements Q1 to Q4, not only FETs for RF but also elements, such as Si-MOSFETs, SiC-MOSFETs or GaN-FETs, can be used.

Even in the case in which the rectifying circuit for high-frequency power supply is configured using the power semiconductor elements Q1 to Q4 in this way, instead of using the diodes D1 to D4, the same advantages as those provided by Embodiment 1 can be provided.

The configuration in which the diodes D1 to D4 shown in FIG. 1 are replaced by the power semiconductor elements Q1 to Q4 is shown in FIG. 10. However, this embodiment is not limited to this example. For example, the rectifying circuit for high-frequency power supply can have a configuration in which the diodes D1 to D4 shown in any one of FIGS. 2 to 8 are replaced by the power semiconductor elements Q1 to Q4. In this case, the rectifying circuit for high-frequency power supply can have a configuration which is an optimal one selected from among configurations in which the diodes D1 to D4 shown in FIGS. 1 to 8 are replaced by the power semiconductor elements Q1 to Q4, according to both the configuration (the output impedance) of the resonant type reception antenna 10, and the input impedance of a device which is connected to the output (DC output) of the rectifying circuit for high-frequency power supply.

Further, although the explanation is made as to the example shown in FIG. 10 by assuming that the constant of the inductor L1 which constructs the matching functional circuit is fixed and the resonance condition is fixed, this embodiment is not limited to this example. A variable resonance condition LC circuit that causes the resonance condition to be variable can be used. Further, also in the configuration in which the diodes D1 to D4 shown in any one of FIGS. 2 to 8 are replaced by the power semiconductor elements Q1 to Q4, a variable resonance condition LC circuit can be similarly applied.

In addition, while the invention has been described in its preferred embodiments, it is to be understood that an arbitrary combination of two or more of the embodiments can be made, various changes can be made in an arbitrary component according to any one of the embodiments, and an arbitrary component according to anyone of the embodiments can be omitted within the scope of the invention.

INDUSTRIAL APPLICABILITY

The rectifying circuit for high-frequency power supply according to the present invention can provide a high power conversion efficiency characteristic in the rectification of an alternating voltage at a high frequency equal to or higher than 2 MHz, and is suitable for use as a rectifying circuit for high-frequency power supply or the like that rectifies an alternating current power supply at a high frequency.

EXPLANATIONS OF REFERENCE NUMERALS 1a and 1b variable resonance condition LC circuit, and 10 resonant type reception antenna (reception antenna for power transmission).

The invention claimed is:

1. A rectifying circuit for a high-frequency power supply comprising:
    a pair of input terminals connected to a reception antenna for power transmission;
    a pair of output terminals;
    an inductor having one end connected to one of the pair of input terminals to which an alternating voltage at a frequency exceeding 2 MHz is to be inputted from the reception antenna for power transmission;
    a bridge rectifier circuit having parasitic capacitance, the bridge rectifier circuit being connected to the other end of the inductor and the other of the pair of input terminals; and a smoothing capacitor having one end connected to one of the pair of output terminals and another end connected to the other of the pair of output terminals, between the bridge rectifier circuit and the pair of output terminals, and wherein the inductor, the parasitic capacitance, and the smoothing capacitor cause said bridge rectifier circuit to perform partial resonant switching in a switching operation at a time of rectification of the bridge rectifier circuit.

2. The rectifying circuit for high-frequency power supply according to claim 1, wherein said bridge rectifier circuit is configured using diodes.

3. The rectifying circuit for high-frequency power supply according to claim 2, wherein said diodes are ones other than diodes for high frequency.

4. The rectifying circuit for high-frequency power supply according to claim 1, wherein said bridge rectifier circuit is configured using field effect transistors.

5. The rectifying circuit for high-frequency power supply according to claim 1, wherein the inductor matches the resonance condition to that of said reception antenna for power transmission according to magnetic-field resonance.

6. The rectifying circuit for high-frequency power supply according to claim 1, wherein the inductor matches the resonance condition to that of said reception antenna for power transmission according to electromagnetic induction.

7. The rectifying circuit for high-frequency power supply according to claim 1, wherein the inductor causes the resonance condition to be variable.

8. A rectifying circuit for a high-frequency power supply comprising:
a pair of input terminals connected to a reception antenna for power transmission;
a pair of output terminals;
an inductor having one end connected to one of the pair of input terminals to which an alternating voltage at a frequency exceeding 2 MHz is to be inputted from the reception antenna for power transmission;
a bridge rectifier circuit having parasitic capacitance, the bridge rectifier circuit being connected to other end of the inductor and the other of the pair of input terminals;
a smoothing capacitor having one end connected to one of the pair of output terminals and another end connected to the other of the pair of output terminals, between the bridge rectifier circuit and the pair of output terminals; and
a second capacitor connected in parallel to each element of the bridge rectifier circuit, and
wherein the inductor, the parasitic capacitance, the second capacitor, and the smoothing capacitor cause the bridge rectifier circuit to perform partial resonant switching in a switching operation at a time of rectification of the bridge rectifier circuit.

9. The rectifying circuit for high-frequency power supply according to claim 8, wherein said bridge rectifier circuit is configured using diodes.

10. The rectifying circuit for high-frequency power supply according to claim 9, wherein said diodes are ones other than diodes for high frequency.

11. The rectifying circuit for high-frequency power supply according to claim 8, wherein said bridge rectifier circuit is configured using field effect transistors.

12. The rectifying circuit for high-frequency power supply according to claim 8, wherein the inductor matches the resonance condition to that of said reception antenna for power transmission according to magnetic-field resonance.

13. The rectifying circuit for high-frequency power supply according to claim 8, wherein the inductor matches the resonance condition to that of said reception antenna for power transmission according to electromagnetic induction.

14. The rectifying circuit for high-frequency power supply according to claim 8, wherein the inductor causes the resonance condition to be variable.

* * * * *